United States Patent [19]

Halada et al.

[11] 4,064,215
[45] Dec. 20, 1977

[54] METHOD OF MANUFACTURING PNEUMATIC TUBULAR TIRES

[75] Inventors: Jumei Halada; Hiromi Akiyoshi, both of Kodaira; Tsutomu Matsunaga, Higashi-Murayama, all of Japan

[73] Assignee: Bridgestone Tire Company Limited, Tokyo, Japan

[21] Appl. No.: 664,721

[22] Filed: Mar. 8, 1976

[30] Foreign Application Priority Data

Mar. 13, 1975 Japan .................................. 50-30385

[51] Int. Cl.² ...................... B29C 5/04; B29C 25/00; B29H 17/00
[52] U.S. Cl. .................................... 264/236; 264/250; 264/261; 264/311; 264/313
[58] Field of Search ............... 264/250, 311, 236, 261, 264/313; 425/435, 110, 324

[56] References Cited

U.S. PATENT DOCUMENTS

| 2,860,379 | 11/1958 | Beckadolph et al. | 264/311 X |
| 3,200,180 | 8/1965 | Russ et al. | 264/311 X |
| 3,645,655 | 2/1972 | Beneze | 264/311 X |
| 3,686,389 | 8/1972 | Beneze | 264/250 |
| 3,976,739 | 8/1976 | Carn | 264/250 X |

FOREIGN PATENT DOCUMENTS 1,246,471 9/1971 United Kingdom ................. 264/311

Primary Examiner—Jan H. Silbaugh
Attorney, Agent, or Firm—Sughrue, Rothwell, Mion, Zinn and Macpeak

[57] ABSTRACT

A tubular tire for bicycle, automobile and the like, having a tubular cross section and comprising a tread portion, side portions and a bottom portion, is manufactured by molding a base tire composed of the side portions and the bottom portion from a fluidizable high polymer material by means of a split mold assembly and then molding the tread portion and hence a tire product from a fluidizable high polymer material by means of a centrifugal molding machine. The split mold assembly comprises a core having an outer peripheral surface coincident with an inner profile of the base tire and separable mold members having an inner peripheral surface coincident with an outer profile of the base tire.

14 Claims, 6 Drawing Figures

METHOD OF MANUFACTURING PNEUMATIC TUBULAR TIRES

This invention relates to a method of manufacturing pneumatic tubular tires for bicycle, automobile and the like, having a tubular cross section in radial direction of tire and comprising a tread portion, side portions and a bottom portion.

Hitherto, tubular tires were used only for racing bicycles because the manufacture of these tires is very difficult. However, it is not necessary for such tires to use inner tubes, so that they can avoid not only various troubles due to the inner tube, such as tube jamming, rapid air leakage in puncture, complicated rim assembling and disassembling and the like, but also can prevent unfixing of bead portions during puncture. Thus, these tires have an advantage as a safety tire capable of running after puncture.

In general, tubular tires for bicycles have been manufactured by extruding a tire-forming material into a hose having substantially a desired final cross section, cutting the hose in a given length, bonding ends of the cutted hose with each other in a ring form, mounting a valve guide on the ring hose and then vulcanizing the ring hose. In this method, a higher skilled technique and many steps are required in the bonding of the hose, so that production yield is poor and also it is apt to cause accidents at the bonded part of the tire in cross-sectional direction thereof.

Furthermore, tubular tires for automobiles have been manufactured by winding filament cords on a soluble mandrel, fixing materials for the side and tread portions thereon, vulcanizing the resulting assembly and then dissolving and removing the mandrel. In this method, very complicated steps are necessary, so that production yield is considerably poor. And also, since there is no material suitable for the mandrel, the manufacture of tire becomes very difficult.

An object of the invention is to solve the above mentioned drawbacks of the prior art and to provide a method of manufacturing pneumatic tubular tires having constant qualities and excellent tire performances by simple and easy steps in mass production.

According to the invention, there is provided a method of manufacturing pneumatic tubular tires having a tubular cross section in radial direction of tire and comprising a tread portion, side portions and a bottom portion, which comprises the steps of 1. coaxially aligning a core of a split mold assembly having an outer peripheral surface coincident with an inner profile of a base tire, which is composed of the bottom portion and side portions and has a continuous opening corresponding to the tread portion in circumferential direction of tire, within separable mold members of the split mold assembly having an inner peripheral surface coincident with an outer profile of the base tire to define a first molding cavity therebetween;

2. pouring a fluidizable high polymer material into the first molding cavity to mold the base tire;

3. separating the separable mold members and core to remove the molded base tire;

4. setting the molded base tire within a tread ring of a centrifugal molding machine having an inner peripheral surface corresponding to an outer peripheral surface of the tread portion to define a second molding cavity therebetween;

5. pouring a fluidizable high polymer material into the second molding cavity by centrifugal force to mold the tread portion and hence a final tire product; and 6. removing the tire product having a desired tubular cross section from the tread ring.

In the invention, the fluidizable high polymer material for base tire includes polyurethane-based polymers; thermoplastic or thermoset resins such as Paraplen 25S (trade name, made by Nippon Polyurethane Co., Ltd.), Koronate 4090 (trade name, made by Nippon Polyurethane Co., Ltd.), Adiprene L-100 (trade name, made by Du Pont Co., Inc.) and the like; natural rubbers; synthetic rubbers and the like. The fluidizable high polymer material for the tread portion includes thermoset resins having a relatively low viscosity such as polyether urethane resins, polyester urethane resins and the like. Since performances required between the base tire and the tread portion are entirely different with each other, various combinations of the high polymer materials can be used in compliance with respective requirements.

In order to improve the performances of the tubular tire according to the invention, one or multi-layered reinforcements of non-woven fabric, cord and the like made from synthetic fibers or metallic fibers may be embedded in the tread portion and bottom portion and also bead wires may be arranged on the side portions. In this manner, the tire does not take off from the rim under normal inflation pressure and is not broken by thrusting of spokes during the running.

The method of the invention is broadly divided into a stage of molding the base tire and a stage of molding the tubular tire from the base tire. In the molding of the base tire, there may be used various methods such as an injection molding, a compression molding, a transfer molding, a centrifugal molding and the like. In the molding of the tubular tire, the centrifugal molding is used. If necessary, the tubular tire manufactured by centrifugal molding of the base tire can be completely cured after-vulcanizing in an oven and the like.

According to the invention, the base tire is formed by means of a split mold assembly constituted with a core having an outer peripheral surface coincident with an inner profile of the base tire and separable mold members having an inner peripheral surface coincident with an outer profile of the base tire. Furthermore, the tubular tire is formed from the base tire by means of a centrifugal molding machine provided with a tread ring having an inner peripheral surface coincident with an outer peripheral surface of the tread portion.

The separable mold members and tread ring are composed, for example, of metallic rigid materials such as steel for ordinary structure, aluminum alloy and the like.

The core is composed of the same rigid material as mentioned above or an elastomeric material having a relatively hard surface. In general, when molding a nearly undeformable base tire as in tubular tires for automobiles, the core is composed of a plurality of core segments having junction surfaces capable of moving in radial direction of tire in succession. Further, when molding the relatively deformable base tire as in tubular tires for bicycles, a single core can be used instead of the above mentioned separable core segments.

The invention will now be described in greater detail with reference to the accompanying drawings, wherein.

Figure 1:
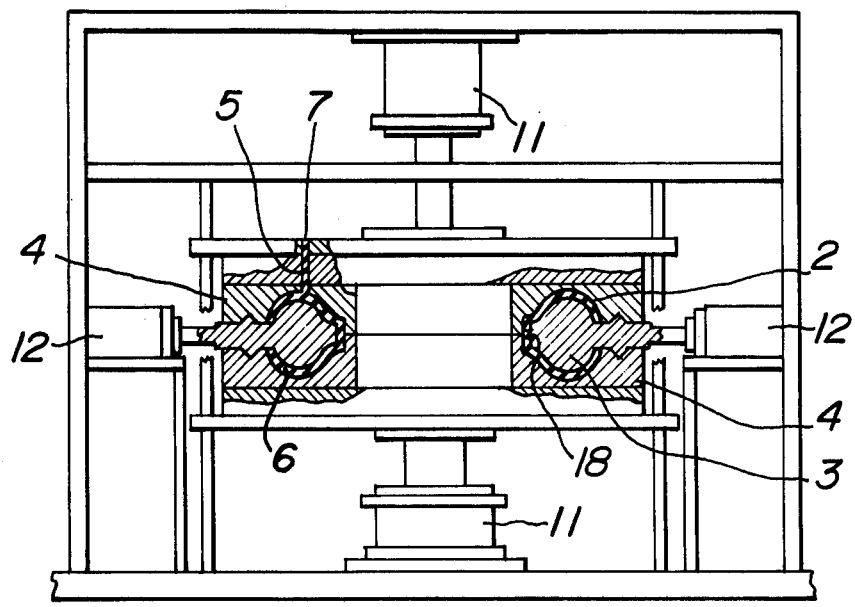
FIG. 1 is a front elevation of one embodiment of the apparatus for molding a base tire by the method according to the invention, showing its essential parts partly in section.

In FIG. 1 is shown one embodiment of the apparatus for molding a base tire according to the invention, wherein separable core segments 3 and separable mold members 4 are coaxially aligned with each other to define a molding cavity 6 and a fluidizable high polymer material 5 for tubular tire to be cast is poured into the cavity 6 coincident with a profile of the base tire 2 through an injection inlet 7 under vacuum.

Figure 2:
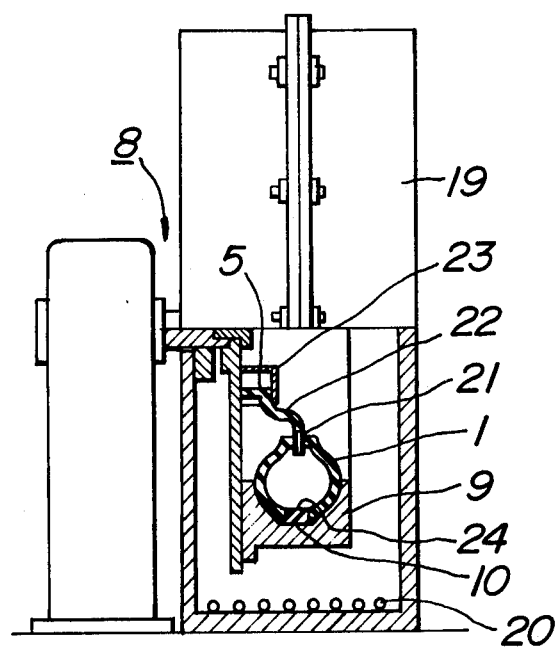
FIG. 2 is a front elevation of one embodiment of the apparatus for molding a tubular tire by the method according to the invention, showing its essential parts partly in section.

In FIG. 2 is one embodiment of the apparatus for molding a tubular tire according to the invention, wherein the molded base tire 2 is set within a tread ring 9 of a centrifugal molding machine 8 and a fluidizable high polymer material 5 for tread portion is poured to form the tread portion 10.

When the tubular tires for automobiles according to the invention are manufactured by the apparatus shown in FIGS. 1 and 2, the separable core segments 3 are coaxially aligned within the separable mold members 4 to define the molding cavity 6. Next, the fluidizable high polymer material 5 is poured into the cavity 6 through the injection inlet 7 under vacuum. After the base tire 2 is molded by curing of the material 5, the separable mold members are moved upwardly and downwardly by means of pistons 11 and separated from the base tire 2 and the separable core segments 3. Then, each of the separable core segments 3 is successively retracted in radial direction of tire by means of pistons 12 to pull it out of base tire 2.

Figure 3:
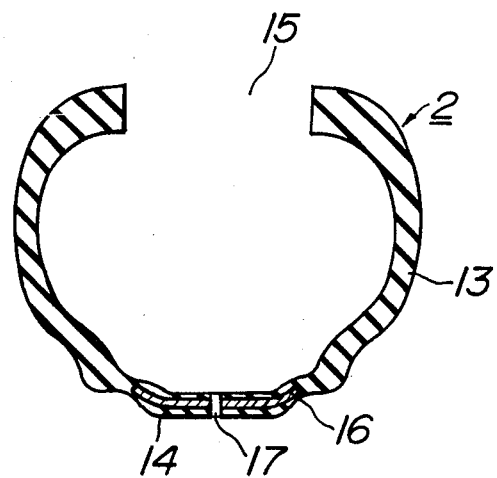
FIG. 3 is a cross-sectional view of the base tire molded by the apparatus shown in FIG. 1.

The base tire 2 is composed of the side portions 13 and bottom portion 14 and has a continuous opening 15 corresponding to the tread portion in circumferential direction of tire as shown in section by FIG. 3. Furthermore, as shown in FIG. 3, the bottom portion 14 may be reinforced with a non-woven fabric mat 16 of long vinylon fibers by setting the mat 16 at a corresponding position of the bottom portion before pouring the fluidizable high polymer material into the molding cavity. In the bottom portion 14 of the base tire 2 is provided a passage 17 which acts as an injection inlet for fluidizable high polymer material at a subsequent step and a valve-fitting guide in the finished tire product. The formation of the passage 17 is carried out by providing a projection 18 at a given position on the separable core segment 3 as shown in FIG. 1 or by drilling the base tire after the molding thereof.

Next, the thus molded base tire 2 is set within a tread ring 9 of a centrifugal molding machine 8 capable of rotating at 100–1,000 r.p.m. as shown in FIG. 2. The inside of the centrifugal molding machine 8 is kept at given temperatures conditions at by means of a heat insulating cover 19 and a steam radiator 20. The fluidizable high polymer material 5 for tread portion is introduced into a molding cavity 24 defined between the base tire 2 and the tread ring 9 from a material container 23 through a connection hose 22 and a valve 21 inserted in the passage 17 of the base tire 2 while rotating the tread ring 9. The tread portion 10 is formed from the high polymer material 5 by centrifugal force. After the tubular tire 1 is molded by curing of the material 5, the connection hose 22 is removed from the valve 21 and the tire 1 is separated from the tread ring 9.

When the side portions 13 of the base tire 2 are set within the tread ring 9 at a contracted state, it can be prevented from distorting the base tire 2 during the centrifugal molding of the tread portion. Furthermore, in order to increase an accuracy of tire thickness, a locating ring 25 can be used as shown in FIG. 4.

Figure 4:
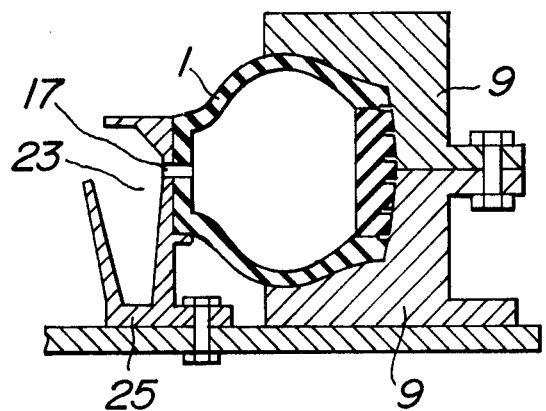
FIG. 4 is a partial cross-sectional view of another embodiment of the tread ring used for the apparatus shown in FIG. 2.

The fluidizable high polymer material for tread portion may be introduced by a method wherein the material is slid by centrifugal force so as to contact with the injection inlet or by a method wherein the material is directly introduced through the passage 17 from the material container 23 in the locating ring 25 as shown in FIG. 4.

If the molded tubular tire 1 is located at a slight depth in the tread ring 9, the tire can easily be taken out from the tread ring 9 by deforming the tire itself. Furthermore, when the tread ring 9 is composed of separable segments as shown in FIG. 4, the tire 1 can also be taken out by separating the segments of the tread ring.

Figure 5:
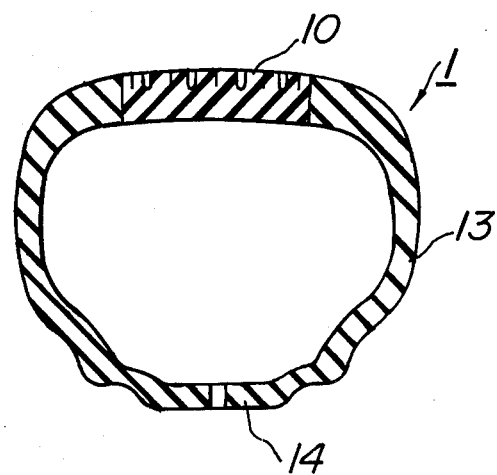
FIG. 5 is a cross-sectional view of the tubular tire molded by the apparatus shown in FIG. 2.

In FIG. 5 is shown one embodiment of the tubular tire 1 manufactured by the method according to the invention, which has a tubular cross section in radial direction of tire and is composed of the tread portion 10, side portions 13 and bottom portion 14.

Figure 6:
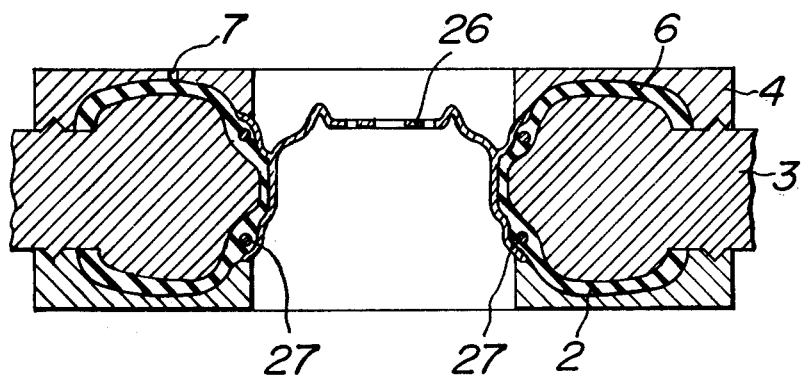
FIG. 6 is a partial cross-sectional view of a further embodiment of the apparatus for molding a base tire by the method according to the invention.

Next, FIG. 6 shows an embodiment of manufacturing a tubular tire for automobile united with a wheel and is a partial cross-sectional view of an apparatus similar to that of FIG. 1.

Referring to FIG. 6, a wheel 26 and the separable core segments 3 are coaxially aligned within separable mold members 4 and then the fluidizable high polymer material is poured into a molding cavity 6 defined by the separable core segments 3, separable mold members 4 and the wheel 26 through the injection inlet 7 under pressure to mold the base tire 2. After the molding of the base tire 2, the separable mold members 4 are moved upwardly and downwardly and then each of the separable core segments 3 is successively retracted outwardly in radial direction of tire, whereby the base tire 2 united with the wheel 26 is taken out from the split mold assembly.

The base tire united with the wheel is molded into the tubular tire in the same manner as described above. In this case, the wheel 26 acts as a locating ring because it is united with the base tire. Consequently, tubular tires having a higher accuracy of tire thickness are manufactured.

In the molding of the base tire, bead wires 27 are previously set in the molding cavity 6 as shown in FIG. 6, whereby tubular tires provided with the bead wires can be manufactured. In this example, the base tire 2 is adhered to the overall surface of the wheel 26, but tubular tires wherein a part of the bottom portion is replaced with the wheel can also be manufactured by contacting the separable core segments 3 with the wheel 26.

According to the invention, tubular tires can be manufactured in compliance with tire performances required for applications by suitable combinations of fluidizable high polymer materials, provision of reinforcing layers, unity with wheel and the like. Furthermore, tubular tires can be manufactured in high efficiency in mass production by two stages, a first stage of which being the molding of the base tire using a split mold assembly and a second stage being the molding of the tire by centrifugal molding.

What is claimed is:

1. A method of manufacturing a pneumatic tubular tire having a tubular cross section in a radial direction of the tire and comprising a tread portion, side portions and a bottom portion, comprising the steps of:
   1. coaxially aligning a core of a split mold assembly having an outer peripheral surface coincident with an inner profile of a base tire composed of the bottom portion, contiguous side portions and a continuous opening corresponding to the tread portion in a circumferential direction of the tire, within separable mold members of the split mold assembly having an inner peripheral surface coincident with an outer profile of the base tire to define a first molding cavity therebetween;
   2. molding a fluidizable high polymer material, selected from the group consisting of polyurethane-based polymers, thermoplastic resins, thermoset resins, natural rubbers and synthetic resins, in the first molding cavity to form the base tire;
   3. separating the separable mold members and core to remove the molded base tire;
   4. setting the molded base tire within a tread ring of a centrifugal molding machine having an inner peripheral surface corresponding to an outer peripheral surface of the tread portion and part of the side portions to define a second molding cavity in the continuous opening;
   5. pouring a fluidizable high polymer material of a low viscosity thermoset resin selected from the group consisting of polyether urethane resins and polyester urethane resins into the second molding cavity by centrifugal force to mold the tread portion and hence produce a final tire; and
   6. removing the tire product having a desired tubular cross section from the tread ring.

2. A method as claimed in claim 1, wherein said tread portion and bottom portion are reinforced with one or multi layers of non-woven fabric or cord made from synthetic or metallic fibers.

3. A method as claimed in claim 1, wherein said side portions are reinforced with bead wires.

4. A method as claimed in claim 1, wherein the molding of said base tire in the step (2) is carried out by injection molding.

5. A method as claimed in claim 1, wherein said method further comprises the step of after-vulcanizing the molded tubular tire in an oven to effect complete curing.

6. A method as claimed in claim 1, wherein said core is composed of a plurality of separable core segments having an outer peripheral surface coincident with an inner profile of a base tire.

7. A method as claimed in claim 1, wherein said core is composed of a single core having an outer peripheral surface coincident with an inner profile of a base tire.

8. A method as claimed in claim 1, wherein said core, separable mold members and tread ring are made from metallic rigid materials of steel for ordinary sturcture or aluminum alloy, respectively.

9. A method as claimed in claim 1, wherein said core is made from an elastomeric material having a relatively hard surface.

10. A method as claimed in claim 1, wherein said tread ring in the step (5) is rotated at a rate of 100–1,000 r.p.m.

11. A method as claimed in claim 1, wherein said tread ring is provided with a locating ring.

12. A method as claimed in claim 1, wherein the molding of said base tire in the step (2) is carried out by compression molding.

13. A method as claimed in claim 1, wherein the molding of said base tire in the step (2) is carried out by transfer molding.

14. A method as claimed in claim 1, wherein the molding of said base tire in the step (2) is carried out by centrifugal molding.

* * * * *